(12) United States Patent
Yamaguchi et al.

(10) Patent No.: US 11,493,721 B2
(45) Date of Patent: Nov. 8, 2022

(54) OPTICAL FIBER HAVING IDENTIFICATION MARK AND MANUFACTURING METHOD FOR OPTICAL FIBER HAVING IDENTIFICATION MARK

(71) Applicant: SUMITOMO ELECTRIC INDUSTRIES, LTD., Osaka (JP)

(72) Inventors: Hideki Yamaguchi, Osaka (JP); Masaaki Hirano, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/272,132

(22) PCT Filed: Aug. 26, 2019

(86) PCT No.: PCT/JP2019/033394
§ 371 (c)(1),
(2) Date: Feb. 26, 2021

(87) PCT Pub. No.: WO2020/045372
PCT Pub. Date: Mar. 5, 2020

(65) Prior Publication Data
US 2021/0325624 A1   Oct. 21, 2021

(30) Foreign Application Priority Data

Aug. 27, 2018   (JP) .............................. JP2018-158775

(51) Int. Cl.
*G02B 6/44* (2006.01)
(52) U.S. Cl.
CPC ......... *G02B 6/4482* (2013.01); *G02B 6/4403* (2013.01); *G02B 6/448* (2013.01)

(58) Field of Classification Search
CPC ..... G02B 6/4482; G02B 6/4403; G02B 6/448
(Continued)

(56) References Cited

U.S. PATENT DOCUMENTS

| 5,379,363 A | 1/1995 | Bonicel et al. |
| 5,485,539 A * | 1/1996 | Mills .................... G02B 6/4403 347/4 |

(Continued)

FOREIGN PATENT DOCUMENTS

| JP | H06-250057 A | 9/1994 |
| JP | H08-062468 A | 3/1996 |

(Continued)

*Primary Examiner* — Jerry M Blevins
(74) *Attorney, Agent, or Firm* — Faegre Drinker Biddle & Reath LLP (57) ABSTRACT

Provided is an optical fiber having identification mark, which includes an optical transmission medium (exemplified by glass fiber) including a core part and a cladding part, a primary resin layer coating the optical transmission medium, and a secondary resin layer coating the primary resin layer, in which identification marks for optical fiber identification (exemplified by continuous identification mark) are provided on a surface of the secondary resin layer at a predetermined interval along an axial direction of the optical transmission medium. An effective area of the optical transmission medium at a wavelength of 1550 nm is 90 μm² or more, the predetermined interval is 100 mm or more and 500 mm or less, and a Young's modulus of the primary resin layer is 0.9 MPa or less.

9 Claims, 4 Drawing Sheets (58) Field of Classification Search
USPC ........................................................ 385/114
See application file for complete search history.

(56) References Cited

U.S. PATENT DOCUMENTS

| | | | |
|---|---|---|---|
| 6,278,828 B1 | 8/2001 | Stocklein et al. | |
| 2004/0028366 A1* | 2/2004 | Watanabe | G02B 6/4482 |
| | | | 385/128 |
| 2017/0031092 A1* | 2/2017 | Sohma | G02B 6/02019 |

FOREIGN PATENT DOCUMENTS

| | | | | |
|---|---|---|---|---|
| JP | 2000-009971 A | | 1/2000 | |
| JP | 2004-077536 A | | 3/2004 | |
| JP | 2004077536 A | * | 3/2004 | ........... G02B 6/4482 |
| JP | 2012-027317 A | | 2/2012 | |
| JP | 2012-247464 A | | 12/2012 | |
| JP | 2015-215447 A | | 12/2015 | |
| JP | 2015-219271 A | | 12/2015 | |

* cited by examiner

| | SAMPLE 1 | SAMPLE 2 | SAMPLE 3 | SAMPLE 4 | SAMPLE 5 | SAMPLE 6 | SAMPLE 7 | SAMPLE 8 | SAMPLE 9 | SAMPLE 10 | SAMPLE 11 | SAMPLE 12 |
|---|---|---|---|---|---|---|---|---|---|---|---|---|
| Aeff [$\mu m^2$] | 90 | 90 | 90 | 100 | 100 | 100 | 80 | 100 | 120 | 120 | 150 | 170 |
| IDENTIFICATION MARK INTERVAL [mm] | 50 | 100 | 200 | 50 | 200 | 350 | 50 | 100 | 200 | 200 | 200 | 200 |
| YOUNG'S MODULUS OF PRIMARY RESIN LAYER [MPa] | 0.9 | 0.9 | 0.9 | 0.9 | 0.9 | 0.9 | 0.9 | 0.6 | 0.6 | 0.2 | 0.2 | 0.2 |
| CHANGE AMOUNT OF TRANSMISSION LOSS [dB/km] | 0.004 | 0.0028 | 0.0001 | 0.007 | 0.0025 | 0.0004 | 0.001 | 0.0008 | 0.0028 | 0.0001 | 0.0009 | 0.0029 |
| DETERMINATION | C | B | A | C | B | A | A | A | B | A | A | B |

OPTICAL FIBER HAVING IDENTIFICATION MARK AND MANUFACTURING METHOD FOR OPTICAL FIBER HAVING IDENTIFICATION MARK

TECHNICAL FIELD

The present disclosure relates to an optical fiber having identification mark and a method for manufacturing an optical fiber having identification mark.

This application claims priority based on Japanese Patent Application No. 2018-158775 filed on Aug. 27, 2018, which is incorporated by reference in its entirety.

BACKGROUND ART

An optical fiber has been known in related art (for example, Patent Literature 1), which has a structure in which a primary resin layer made of a soft resin having a relatively low Young's modulus is provided outside an optical transmission medium (also referred to as glass fiber), and a secondary resin layer made of a hard resin having a relatively high Young's modulus is provided outside the primary resin layer. In addition, a structure in which an identification mark for identifying the type of the optical fiber is provided to a coating resin layer is disclosed in Patent Literatures 2 to 5.

CITATION LIST

Patent Literature

Patent Literature 1: JP-A-2015-219271
Patent Literature 2: JP-A-2012-247464
Patent Literature 3: JP-A-2012-27317
Patent Literature 4: JP-A-2015-215447
Patent Literature 5: JP-A-2000-009971

SUMMARY OF INVENTION

An optical fiber having identification mark according to an aspect of the present disclosure is an optical fiber having identification mark, including: an optical transmission medium including a core part and a cladding part; a primary resin layer coating the optical transmission medium; and a secondary resin layer coating the primary resin layer, in which identification marks for optical fiber identification are provided on a surface of the secondary resin layer at a predetermined interval along an axial direction of the optical transmission medium, and an effective area of the optical transmission medium at a wavelength of 1550 nm is 90 $\mu m^2$ or more, the predetermined interval is 100 mm or more and 500 mm or less, and a Young's modulus of the primary resin layer is 0.9 MPa or less.

A method for manufacturing an optical fiber having identification mark according to an aspect of the present disclosure is a method for manufacturing an optical fiber having identification mark, the optical fiber having identification mark including an optical transmission medium including a core part and a cladding part, a primary resin layer coating the optical transmission medium, a secondary resin layer coating the primary resin layer, and a colored layer, and identification marks for optical fiber identification being provided on an outer surface of the secondary resin layer or the colored layer at a predetermined interval along an axial direction of the optical transmission medium, in which an effective area of the optical transmission medium at a wavelength of 1550 nm is 90 $\mu m^2$ or more, and a Young's modulus of the primary resin layer is 0.9 MPa or less, the method including: a step of providing the identification marks on the outer surface of the secondary resin layer or the colored layer at an interval of 100 mm or more and 500 mm or less; and a step of measuring a transmission loss after providing the mark at a wavelength of 1550 nm for the optical fiber provided with the identification mark, in which an excess loss of the measured transmission loss after providing the mark is 0.003 dB/km or less.

DESCRIPTION OF EMBODIMENTS

Problems to be Solved by Present Disclosure

It is known that it is possible to identify an optical fiber by providing an optical fiber color and an identification mark (generally referred to as a dot mark or a ring mark) to the optical fiber. A larger number of optical fibers can be identified by the combination of the optical fiber color and the identification mark. However, the identification mark applies stress to the optical fiber and causes a micro bend loss, and the transmission loss of the optical fiber may be increased. In particular, when an effective area of the optical transmission medium is increased, the optical transmission medium sensitively reacts to lateral pressure (external stress), and a transmission loss of the optical fiber is likely to increase during the processing of the optical fiber, for example, when the optical fiber is formed into a cable or housed in a repeater.

Accordingly, an object of the present disclosure is to provide an optical fiber having identification mark and a method for manufacturing an optical fiber having identification mark, which make an increase in the transmission loss almost zero.

Effects of the Present Disclosure

The present disclosure is capable of providing an optical fiber having identification mark that makes an increase in the transmission loss almost zero.

Description of Embodiments of the Present Disclosure

First, the content of an embodiment of the present disclosure will be listed and described.

(1) An optical fiber having identification mark according to an aspect of the present disclosure is an optical fiber having identification mark, including: an optical transmission medium including a core part and a cladding part; a primary resin layer coating the optical transmission medium; and a secondary resin layer coating the primary resin layer, in which identification marks for optical fiber identification are provided on a surface of the secondary resin layer at a predetermined interval along an axial direction of the optical transmission medium, and an effective area of the optical transmission medium at a wavelength of 1550 nm is 90 $\mu m^2$ or more, the predetermined interval is 100 mm or more and 500 mm or less, and a Young's modulus of the primary resin layer is 0.9 MPa or less. When the effective area at the wavelength of 1550 nm is increased to 90 $\mu m^2$ or more in order to satisfy the requirement of low non-linearization, the micro bend loss may increase. However, the Young's modulus of the primary resin layer is set to 0.9 MPa or less, so that the micro bend loss can be reduced. In addition, when the interval between the identification marks is less than 100 mm, the transmission loss tends to increase. However, the interval between the identification marks is set to 100 mm or more, so that an increase in the transmission loss can be prevented. As a result, it is possible to provide an optical fiber having identification mark that makes an increase in the transmission loss at a wavelength of 1550 nm almost zero. Further, since the interval between the identification marks is set to 500 mm or less, an optical fiber can be easily identified during cable work.

(2) In an aspect of the optical fiber having identification mark according to the present disclosure, the predetermined interval is 200 mm or more, and the effective area of the optical transmission medium is 100 $\mu m^2$ or more and 170 $\mu m^2$ or less. When the interval between the identification marks is set to 200 mm or more, it is possible to shorten the period until the transmission loss is stabilized even when the optical fiber with the increased effective area is wound around a spool.

(3) In an aspect of the optical fiber having identification mark according to the present disclosure, the predetermined interval is 200 mm or more and 350 mm or less, and the Young's modulus of the primary resin layer is 0.6 MPa or less. When the interval between the identification marks is set to 200 mm or more and 350 mm or less and the Young's modulus of the primary resin layer is set to 0.6 MPa or less, an increase in the transmission loss can be made almost zero even when the effective area of the optical fiber is increased.

(4) In an aspect of the optical fiber having identification mark according to the present disclosure, a transmission loss of the optical transmission medium at a wavelength of 1550 nm is 0.17 dB/km or less. The optical fiber having identification mark according to the present disclosure can be used for a submarine type optical fiber for and an optical fiber for a terrestrial trunk line for which a long distance transmission of several thousand kilometers is necessary and a transmission loss of 0.17 dB/km or less is required.

(5) In an aspect of the optical fiber having identification mark according to the present disclosure, the identification mark is a single identification mark. Since the number of marks is small, it is possible to more reliably prevent an increase in the transmission loss.

(6) In an aspect of the optical fiber having identification mark according to the present disclosure, the identification mark is a continuous identification mark in which a plurality of identification marks are formed continuously. A larger number of optical fibers can be identified.

(7) In an aspect of the optical fiber having identification mark according to the present disclosure, provided is an optical fiber ribbon in which a plurality of the optical fibers having identification mark as described above are arranged in parallel and a circumference of each of the plurality of optical fibers having identification mark is coated with a tape coating, in which the optical fiber ribbon includes the optical fibers having identification mark, whose predetermined intervals are different from each other. Even when a plurality of optical fibers are arranged, if the intervals between the identification marks are different, the optical fibers can be identified even if the optical fibers have the same optical fiber color. Therefore, a larger number of optical fibers can be housed.

(8) In an aspect of the optical fiber having identification mark according to the present disclosure, provided is an optical fiber cable in which a plurality of the optical fibers having identification mark as described above are housed, in which the optical fiber cable includes the optical fibers having identification mark, whose predetermined intervals are different from each other. Even when a plurality of optical fibers are housed, if the intervals between the identification marks are different, the optical fibers can be identified even if the optical fibers have the same optical fiber color. Therefore, a larger number of optical fibers can be housed.

(9) A method for manufacturing an optical fiber having identification mark according to an aspect of the present disclosure is a method for manufacturing an optical fiber having identification mark, the optical fiber having identification mark including an optical transmission medium including a core part and a cladding part, a primary resin layer coating the optical transmission medium, a secondary resin layer coating the primary resin layer, and a colored layer, and identification marks for optical fiber identification being provided on an outer surface of the secondary resin layer or the colored layer at a predetermined interval along an axial direction of the optical transmission medium, in which an effective area of the optical transmission medium at a wavelength of 1550 nm is 90 $\mu m^2$ or more, and a Young's modulus of the primary resin layer is 0.9 MPa or less, the method including: a step of providing the identification marks on the outer surface of the secondary resin layer or the colored layer at an interval of 100 mm or more and 500 mm or less; and a step of measuring a transmission loss after providing the mark at a wavelength of 1550 nm for the optical fiber provided with the identification mark, in which an excess loss of the measured transmission loss after providing the mark is 0.003 dB/km or less. Since the excess loss of the transmission loss after providing the mark is 0.003 dB/km or less, it is possible to manufacture an optical fiber having identification mark that makes an increase in the transmission loss of the optical transmission medium at the wavelength of 1550 nm almost zero. Here, the excess loss of the transmission loss after providing the mark is an increase amount of the transmission loss due to the presence of the identification mark, and can be estimated from wavelength dependence of the transmission loss of the optical fiber having identification mark. The excess loss of the transmission loss after providing the mark can also be directly calculated from a difference between a transmission loss value of the optical fiber before the identification mark is provided thereon and a transmission loss value of the optical fiber after the identification mark is provided thereon.

DETAILS OF EMBODIMENTS OF THE PRESENT DISCLOSURE

Hereinafter, preferred embodiments of an optical fiber having identification mark and a method for manufacturing an optical fiber having identification mark according to the present disclosure will be described with reference to the accompanying drawings.

Figure 1:
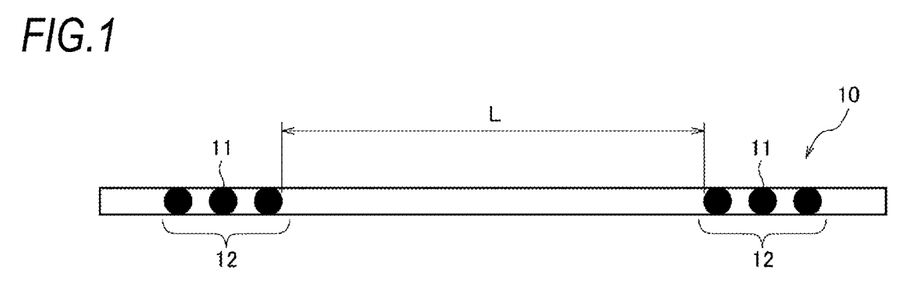
FIG. 1 illustrates an example of an appearance of an optical fiber having identification mark according to a first embodiment of the present disclosure.
Figure 2:
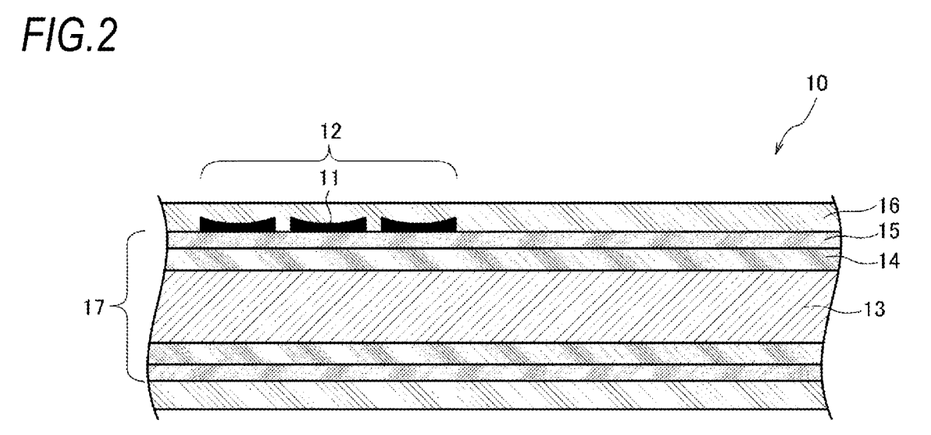
FIG. 2 illustrates an example of a longitudinal cross section of the optical fiber having identification mark in FIG. 1.

FIG. 1 illustrates an example of an appearance of an optical fiber having identification mark according to a first embodiment of the present disclosure, and FIG. 2 illustrates an example of a longitudinal cross section of the optical fiber having identification mark in FIG. 1.

As shown in FIG. 1, in an optical fiber 10 having identification mark, an identification mark indicating a type of an optical fiber is formed of a plurality of continuous identification marks 12 by, for example, spraying ink with an ink jet printer. The continuous identification mark 12 is repeated with an identification mark interval L, and is formed over the entire length of the optical fiber. The identification mark interval L corresponds to the predetermined interval according to the present disclosure. The continuous identification mark 12 shown in FIG. 1 includes, for example, three identification marks 11 (also referred to as a triple identification mark). The continuous identification mark referred to in the present disclosure refers to a series of identification mark groups in which a plurality of identification marks are formed at intervals shorter than the identification mark interval L, which can be recognized visually.

As shown in FIG. 2, the optical fiber 10 having identification mark includes a glass fiber 13, a primary resin layer 14, a secondary resin layer 15, identification marks 11, and a colored layer 16. In FIG. 2, the identification marks 11 are provided on an outer surface of the secondary resin layer 15, and there is an advantage that the identification marks 11 are less likely to disappear. The identification marks 11 may be provided on a surface of the colored layer 16, and in this case, the identification marks can be provided in a later step on an optical fiber provided with the colored layer 16. The glass fiber 13 corresponds to the optical transmission medium according to the present disclosure. A member, in which an outer side of the glass fiber 13 is coated with the primary resin layer 14 and further, an outer side of the primary resin layer 14 is coated with the secondary resin layer 15, is also referred to as a coated optical fiber 17.

The glass fiber 13 is an optical waveguide that is formed of, for example, pure $SiO_2$ glass and has a standard outer diameter of, for example, 125 μm. The glass fiber 13 includes a core part and a cladding part. The core part is provided in, for example, an area including a central axis of the glass fiber 13, and the cladding part is provided in an area surrounding the core part. The cladding part is doped with, for example, a fluorine element in order to have a refractive index lower than a refractive index of the core part. The core part may contain $GeO_2$, a fluorine element, and a chlorine element, and the cladding part may be formed of pure $SiO_2$ glass or $SiO_2$ glass that contains a chlorine element.

While the outer diameter of the glass fiber 13 is 125 μm, an effective area Aeff of the glass fiber 13 at a wavelength of 1550 nm is within a range of 70 to 90 μm$^2$ in a single mode fiber recommended by general-purpose ITU-T G.652. In the application of long distance transmission, in order to satisfy the requirement of low non-linearization, the effective area Aeff is 90 μm$^2$ or more, preferably 100 μm$^2$ or more, and more preferably 120 μm$^2$ or more. When the effective area Aeff increases, the micro bend loss and the macro bend loss becomes worse, and thus an upper limit value is, for example, 170 μm$^2$. However, the effective area Aeff may increase beyond the upper limit value depending on the application of the optical fiber. The transmission loss of the glass fiber 13 at a wavelength of 1550 nm is, for example, 0.17 dB/km or less. The transmission loss is not limited thereto, and the glass fiber becomes more suitable for the long distance transmission as the transmission loss decreases. In the present technology, an optical fiber having a transmission loss of 0.14 dB/km is realized. When a transmission distance is, for example, 3,000 km or less, the transmission loss may be about 0.2 dB/km.

The primary resin layer 14 is a coating layer (layer thickness of about 30 μm to 50 μm) having an outer diameter of about 140 μm to 220 μm, and is formed of a soft resin having a relatively low Young's modulus. The secondary resin layer 15 is a coating layer (layer thickness of about 10 μm to 35 μm) having an outer diameter of about 180 μm to 260 μm, and is formed of a hard resin having a relatively high Young's modulus. The loss during spool winding can be reduced by softening the primary resin layer 14 (reducing the Young's modulus).

The Young's modulus of the primary resin layer 14 is, for example, 0.9 MPa or less, and a lower limit value of the Young's modulus of the primary resin layer 14 is, for example, 0.07 MPa. When the effective area Aeff is increased to 90 μm$^2$ or more as described above, the micro bend loss may increase. However, the lower the Young's modulus of the primary resin layer 14 is, the higher the resistance to the micro bend loss becomes. The Young's modulus is set to 0.9 MPa or less, so that the micro bend loss can be reduced. In addition, when the Young's modulus is preferably 0.6 MPa or less, and more preferably 0.2 MPa or less, the effective area Aeff can be further increased, or the outer diameter of the optical fiber can be reduced to 220 μm or less. When the Young's modulus of the primary resin layer 14 is low, the mechanical strength and the environmental reliability of the optical fiber may be deteriorated. Therefore, the Young's modulus of the primary resin layer 14 is preferably, for example, 0.07 MPa or more.

The Young's modulus of the secondary resin layer 15 is about 500 MPa to 2000 MPa in order to ensure mechanical strength.

The colored layer 16 has a layer thickness of, for example, about 5 μm to 10 μm, and is colored to be transparent or translucent with an ultraviolet ray curable ink (for example, urethane acrylate). When an outer diameter of the colored optical fiber is as small as, for example, 210 μm or less, more optical fibers can be housed in an optical fiber cable having the same shape.

When the continuous identification marks 12 are provided at an identification mark interval L along the axial direction of the glass fiber 13, and the identification mark interval L is, for example, less than 100 mm, a large lateral pressure is applied to the glass fiber 13, and the micro bend loss may occur in the glass fiber 13. Therefore, in the present disclosure, the micro bend loss has been prevented by adjusting the optimum identification mark interval L when the effective area Aeff of the glass fiber 13 is 90 µm² or more and the Young's modulus of the primary resin layer 14 is 0.9 MPa or less.

Figure 3A:
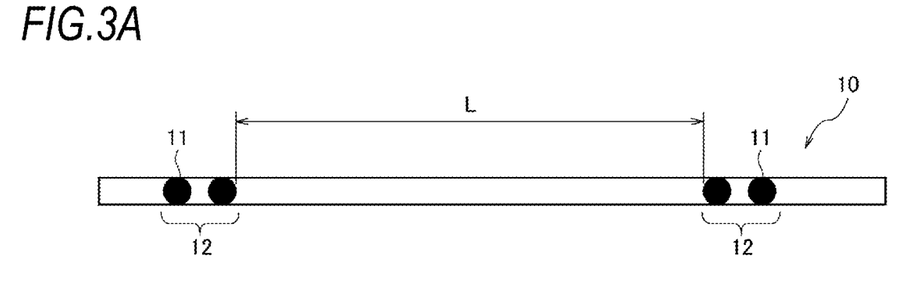
FIG. 3A illustrates an example of an appearance of an optical fiber having identification mark according to second and third embodiments of the present disclosure.
Figure 3B:
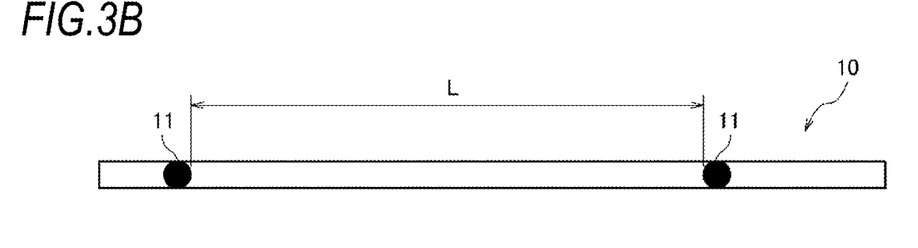
FIG. 3B illustrates an example of an appearance of an optical fiber having identification mark according to the second and third embodiments of the present disclosure.

The triple identification mark has been described as an example in FIG. 1, but the present invention is not limited to this example. For example, as shown in FIG. 3A, an identification mark for optical fiber identification may be formed by, for example, a continuous identification mark 12 (also referred to as a double identification mark) in which two identification marks 11 are continuous. It should be noted that the continuous identification mark 12 may include four or more identification marks 11. Alternatively, as shown in FIG. 3B, an identification mark for optical fiber identification may be a single identification mark 11. Also in these cases, the identification marks for optical fiber identification are repeated at the identification mark interval L, and are formed over the entire length of the optical fiber.

Figure 4:
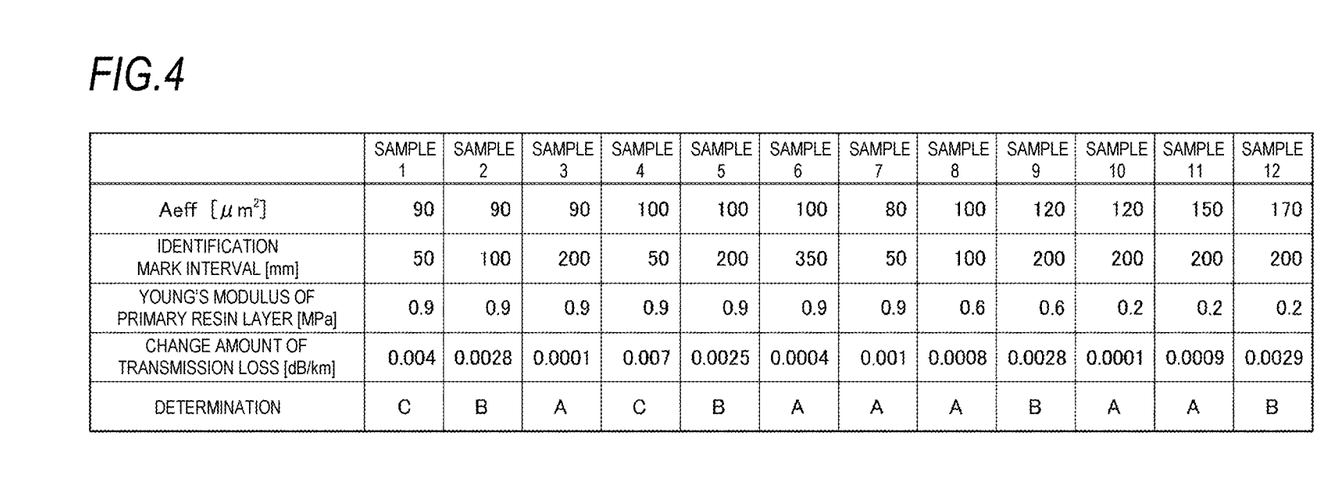
FIG. 4 illustrates a table showing evaluation results of optical fibers having identification mark at a wavelength of 1550 nm.
Figure 5:
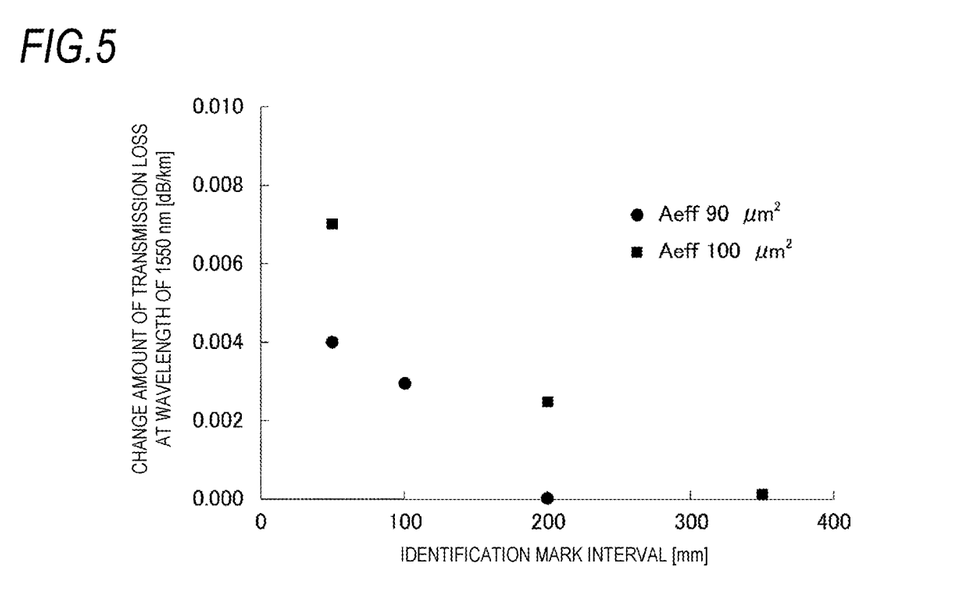
FIG. 5 illustrates a relation between an identification mark interval and a change amount of a transmission loss.

FIG. 4 is a table showing evaluation results of optical fibers having identification mark at a wavelength of 1550 nm, and FIG. 5 illustrates a relation between an identification mark interval and a change amount of a transmission loss at a wavelength of 1550 nm.

In the present disclosure, in order to determine an optimum identification mark interval a transmission loss before providing the mark and a transmission loss after providing the mark are measured. Specifically, first, an optical fiber, in which the effective area Aeff of the glass fiber 13 at a wavelength of 1550 nm is 90 µm² or more, a Young's modulus of the primary resin layer 14 is 0.9 MPa or less, and, for example, no identification mark 11 is provided on the surface of the secondary resin layer 15, is prepared (fiber preparation step).

Next, the transmission loss before providing the mark is measured at a wavelength of 1550 nm for the optical fiber on which no identification mark 11 is provided (a step of measuring a first transmission loss). Subsequently, the continuous identification marks 12 are provided on the surface of the secondary resin layer 15 at an identification mark interval L of 100 mm or more and 500 mm or less (marking step). Next, the transmission loss after providing the mark is measured at a wavelength of 1550 nm for the optical fiber provided with the continuous identification marks 12 (a step of measuring a second transmission loss).

When a difference (also referred to as the change amount of the transmission loss at the wavelength of 1550 nm) between the measured transmission loss after the mark providing (the second transmission loss) and the measured transmission loss before the mark providing (the first transmission loss) is larger than 0.003 dB/km (determination: C), the change amount of the transmission loss is evaluated to be large. Further, the change amount of the transmission loss is evaluated to be preferable (determination: B) when the difference is 0.003 dB/km or less, and the change amount of the transmission loss is evaluated to be more preferable when the difference is 0.001 dB/km or less (determination: A) (fiber evaluation step), and the optimum identification mark interval is determined.

More specifically, as shown in FIG. 4, regarding Sample 1, the effective area Aeff of the glass fiber 13 is 90 µm², the Young's modulus of the primary resin layer 14 is 0.9 MPa, and the identification mark interval is 50 mm. The transmission loss of the glass fiber 13 at a wavelength of 1550 nm is 0.1680 dB/km, which is within the range of 0.17 dB/km or less. In this case, the change amount of the transmission loss at the wavelength of 1550 nm is 0.004 dB/km, which is not within the range of 0.003 dB/km or less, and thus the determination is C.

Regarding Sample 2, the effective area Aeff is 90 µm² and the Young's modulus of the primary resin layer 14 is 0.9 MPa, which are the same as those of Sample 1, but the identification mark interval is 100 mm. The transmission loss of the glass fiber 13 at the wavelength of 1550 nm is 0.1668 dB/km, which is within the range of 0.17 dB/km or less. In this case, the change amount of the transmission loss is 0.0028 dB/km, which is within the range of 0.003 dB/km or less. However, the change amount of the transmission loss is not within the range of 0.001 dB/km or less, and thus the determination is B.

Regarding Sample 3, the effective area Aeff is 90 µm² and the Young's modulus of the primary resin layer 14 is 0.9 MPa, which are the same as those of Sample 1, but the identification mark interval is 200 mm. The transmission loss of the glass fiber 13 at the wavelength of 1550 nm is 0.1641 dB/km, which is within the range of 0.17 dB/km or less. In this case, the change amount of a transmission loss is 0.0001 dB/km, which is within the range of 0.001 dB/km or less, and thus the determination is A.

Regarding Sample 4, the effective area Aeff is 100 µm² and the Young's modulus of the primary resin layer 14 is 0.9 MPa, but the identification mark interval is 50 mm. The transmission loss of the glass fiber 13 at the wavelength of 1550 nm is 0.1592 dB/km, which is within the range of 0.17 dB/km or less. In this case, the change amount of the transmission loss is 0.007 dB/km, which is not within the range of 0.003 dB/km or less, and thus the determination is C.

Regarding Sample 5, the effective area Aeff is 100 µm² and the Young's modulus of the primary resin layer 14 is 0.9 MPa, which are the same as those of Sample 4, but the identification mark interval is 200 mm. The transmission loss of the glass fiber 13 at the wavelength of 1550 nm is 0.1547 dB/km, which is within the range of 0.17 dB/km or less. In this case, the change amount of the transmission loss is 0.0025 dB/km, which is within the range of 0.003 dB/km or less. However, the change amount of the transmission loss is not within the range of 0.001 dB/km or less, and thus the determination is B.

Regarding Sample 6, the effective area Aeff is 100 µm² and the Young's modulus of the primary resin layer 14 is 0.9 MPa, which are the same as those of Sample 4, but the identification mark interval is 350 mm. The transmission loss of the glass fiber 13 at the wavelength of 1550 nm is 0.1526 dB/km, which is within the range of 0.17 dB/km or less. In this case, the change amount of the transmission loss is 0.0004 dB/km, which is within the range of 0.001 dB/km or less, and thus the determination is A.

Regarding Sample 7, the Young's modulus of the primary resin layer 14 is 0.9 MPa, but the effective area Aeff is 80 µm², and the identification mark interval is 50 mm. In this case, the change amount of a transmission loss is 0.001 dB/km, which is within the range of 0.001 dB/km or less, and thus the determination is A. However, the transmission loss of the glass fiber 13 at the wavelength of 1550 nm is 0.1950 dB/km, which is not within the range of 0.17 dB/km or less.

Regarding Sample 8, the effective area Aeff is 100 µm² which is the same as that of Sample 4, but the Young's modulus of the primary resin layer 14 is 0.6 MPa, and the identification mark interval is 100 mm. The transmission loss of the glass fiber 13 at the wavelength of 1550 nm is 0.1523 dB/km, which is within the range of 0.17 dB/km or less. In this case, the change amount of the transmission loss is 0.0008 dB/km, which is within the range of 0.001 dB/km or less, and thus the determination is A.

Regarding Sample 9, the effective area Aeff is 120 μm², but the Young's modulus of the primary resin layer 14 is 0.6 MPa which is the same as that of Sample 8, and the identification mark interval is 200 mm. The transmission loss of the glass fiber 13 at the wavelength of 1550 nm is 0.1523 dB/km, which is within the range of 0.17 dB/km or less. In this case, the change amount of the transmission loss is 0.0028 dB/km, which is within the range of 0.003 dB/km or less. However, the change amount of the transmission loss is not within the range of 0.001 dB/km or less, and thus the determination is B.

Regarding Sample 10, the effective area Aeff is 120 μm² which is the same as that of Sample 9, but the Young's modulus of the primary resin layer 14 is 0.2 MPa, and the identification mark interval is 200 mm. The transmission loss of the glass fiber 13 at the wavelength of 1550 nm is 0.1496 dB/km, which is within the range of 0.17 dB/km or less. In this case, the change amount of the transmission loss is 0.0001 dB/km, which is within the range of 0.001 dB/km or less, and thus the determination is A.

Regarding Sample 11, the effective area Aeff is 150 μm², the Young's modulus of the primary resin layer 14 is 0.2 MPa, and the identification mark interval is 200 mm. The transmission loss of the glass fiber 13 at the wavelength of 1550 nm is 0.1447 dB/km, which is within the range of 0.17 dB/km or less. In this case, the change amount of the transmission loss is 0.0009 dB/km, which is within the range of 0.001 dB/km or less, and thus the determination is A.

Regarding Sample 12, the effective area Aeff is 170 μm², the Young's modulus of the primary resin layer 14 is 0.2 MPa, and the identification mark interval is 200 mm. The transmission loss of the glass fiber 13 at the wavelength of 1550 nm is 0.1467 dB/km, which is within the range of 0.17 dB/km or less. In this case, the change amount of the transmission loss is 0.0029 dB/km, which is within the range of 0.003 dB/km or less. However, the change amount of the transmission loss is not within the range of 0.001 dB/km or less, and thus the determination is B.

As shown in FIG. 5, the cases where the Young's modulus of the primary resin layer 14 is 0.9 MPa (Samples 1 to 6) are plotted with the identification mark interval being set on a horizontal axis, and the change amount of the transmission loss at the wavelength of 1550 nm being set on a vertical axis.

For the cases where the effective area Aeff is 90 μm² (Samples 1 to 3: indicated by black circles in FIG. 5), it can be seen that the change amount of the transmission loss is not within the range of 0.003 dB/km or less when the identification mark interval is less than 100 mm.

For the case where the effective area Aeff is 100 μm² (Samples 4 to 6: indicated by black squares in FIG. 5), it can be seen that the change amount of the transmission loss is not within the range of 0.003 dB/km or less when the identification mark interval is less than 200 mm.

Here, in a case where the effective area Aeff is 80 μm² (Sample 7), the transmission loss of the glass fiber 13 at the wavelength of 1550 nm is not within the range of 0.17 dB/km or less, and thus, plot is omitted.

As described above, the identification mark interval is set to 100 mm or more in the case where the effective area Aeff is 90 μm² (Sample 2, Sample 3), so that the stress due to the continuous identification marks 12 can be reduced, and an increase in the transmission loss can be prevented. Accordingly, it is possible to provide an optical fiber having identification mark in which the change amount of the transmission loss is 0.003 dB/km or less. Since the identification mark interval is set to 500 mm or less, the optical fiber can be easily identified during the cable work.

When the effective area Aeff is 100 μm² and the identification mark interval is set to 200 mm or more (Sample 5, Sample 6), even when an optical fiber with an enlarged effective area is wound around a spool (not shown), it is possible to shorten a period from immediately after winding the optical fiber around the spool until a transmission loss is stabilized (also referred to as a relaxation time of the transmission loss). Specifically, when the identification mark interval is less than 200 mm (for example, 50 mm), the relaxation time of the transmission loss is required for dozens of days, but when the identification mark interval is 200 mm or more, the relaxation time of the transmission loss is required for several days.

When the effective area Aeff is 100 μm², the Young's modulus of the primary resin layer 14 is 0.9 MPa, and the identification mark interval is set to 200 mm or more, the change amount of the transmission loss can be 0.003 dB/km or less, and further, the increase in the transmission loss can be made almost zero when the Young's modulus of the primary resin layer 14 is set to 0.6 MPa. Although illustration is omitted, it was possible to make the increase in the transmission loss almost zero until the identification mark interval is 350 mm. The change amount of the transmission loss can be 0.003 dB/km or less when the effective area Aeff is 120 μm², the Young's modulus of the primary resin layer 14 is 0.6 MPa, and the identification mark interval is 200 mm or more. The change amount of the transmission loss can be 0.001 dB/km or less when the effective area Aeff is 150 μm², the Young's modulus of the primary resin layer 14 is 0.2 MPa, and the identification mark interval is 200 mm or more. The change amount of the transmission loss can be 0.003 dB/km or less when the effective area Aeff is 170 μm², the Young's modulus of the primary resin layer 14 is 0.2 MPa, and the identification mark interval is 200 mm or more. As a result, the optical fiber having identification mark can be used for a submarine type optical fiber and an optical fiber for a terrestrial trunk line for which a long distance transmission of several thousand kilometers is necessary and a transmission loss of 0.17 dB/km or less is required.

The optical fibers 10 having identification marks can be distinguished from each other by a combination of a color of the colored layer 16 and the identification marks. For example, in a case where 12 colors such as red, blue, yellow, and white are used for a colored layer, a total of 48 optical fibers can be identified by combination with a case where there is no identification mark, a case where a single identification mark is provided, a case where a double identification mark is provided, and a case where a triple identification mark is provided.

When the continuous identification mark 12 is provided, a larger micro bend may occur, and the transmission loss may increase. Therefore, especially when Aeff is as large as 130 μm² or more, it may be desirable to use a single identification mark. In this case, the optical fibers can be distinguished from each other by a combination of a color of the colored layer 16 and an identification mark interval. For example, in a case where 12 colors such as red, blue, yellow, and white are used for a colored layer, a total of 60 optical fibers can be identified by combination with a case where there is no identification mark, a case where a single identification mark is provided and an interval between identification marks is 200 mm, a case where a single identification mark is provided and an identification mark interval is 240 mm, a case where a single identification mark is provided and an identification mark interval is 280 mm, and a case where a single identification mark is provided and an identification mark interval is 350 mm.

In addition, the optical fibers may be identified by a combination of the color of the colored layer, the number of identification marks, and the identification mark interval. For example, in a case where 12 colors such as red, blue, yellow, and white are used for a colored layer, a total of 60 optical fibers can be identified by combination with a case where there is no identification mark, a case where a single identification mark is provided and an interval between identification marks is 200 mm, a case where a single identification mark is provided and an identification mark interval is 240 mm, a case where a double identification mark is provided and an identification mark interval is 200 mm, and a case where a double identification mark is provided and an identification mark interval is 260 mm.

Figure 6:
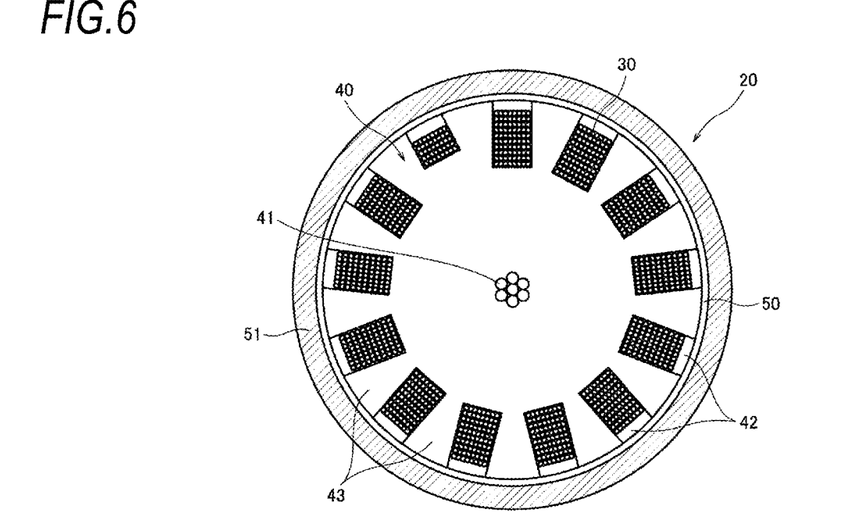
FIG. 6 illustrates an example of an optical fiber cable in which optical fibers having identification mark are housed.
Figure 7A:
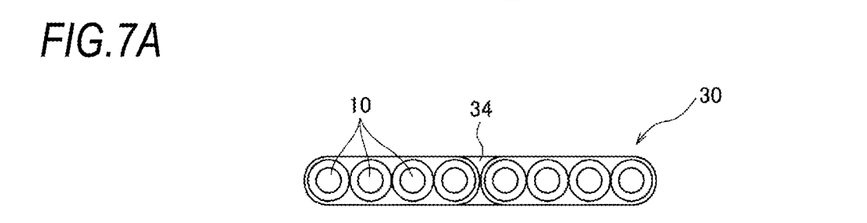
FIG. 7A illustrates an example of an optical fiber ribbon using optical fibers having identification mark.
Figure 7B:
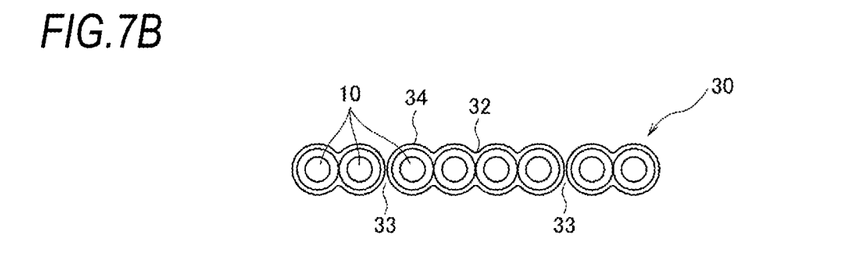
FIG. 7B illustrates an example of an optical fiber ribbon using optical fibers having identification mark.
Figure 7C:
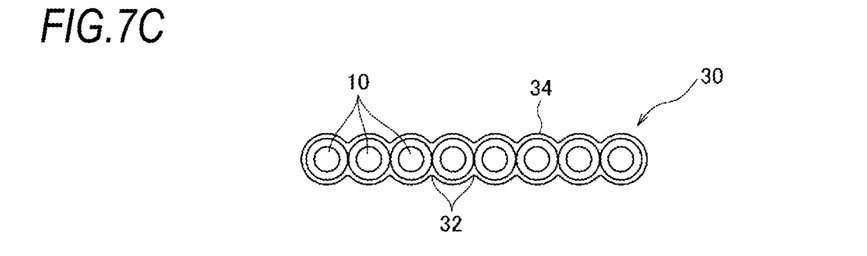
FIG. 7C illustrates an example of an optical fiber ribbon using optical fibers having identification mark.

FIG. 6 illustrates an example of an optical fiber cable in which optical fibers having identification mark are housed, and FIGS. 7A to 7C illustrate an example of an optical fiber ribbon using optical fibers having identification mark.

An optical fiber cable 20 shown in FIG. 6 includes a slot rod 40, a wrapping tape 50 that is longitudinally wrapped or helically wrapped on a circumference of the slot rod 40, and a cable sheath 51 wrapped on a circumference of the wrapping tape 50.

Tension members 41 are embedded in a central portion of the slot rod 40. As the tension members 41, a wire material having resistance to tension and compression, for example, a steel wire, fiber reinforced plastics (FRP), or the like is used.

On an outer peripheral surface of the slot rod 40, a plurality of (for example, 13) spiral or SZ-shaped slot grooves 42 are formed along a longitudinal direction of a cable. Slot ribs 23 extend radially from a circumference of the tension members 21, and the slot rib 43 form the slot groove 42 and separates the slot groove 42 from other slot grooves 42. In order to facilitate identification of the slot groove 42, a mark may be provided on an outer periphery of the slot rib 43.

In the slot groove 42, 100 optical fibers, which is formed by using, for example, 125 connected optical fiber ribbons 30 each having eight optical fibers, is housed.

Specifically, as shown in FIG. 7A, the optical fiber ribbon 30 is formed by arranging, for example, eight optical fibers 10 having identification mark in parallel, and integrating the eight optical fibers 10 having identification mark into a tape shape by a common coating (indicated by a tape coating 34) made of an ultraviolet ray curable resin or the like over the entire length. The optical fiber ribbon 30 includes optical fibers 10 having identification mark, which have different identification mark intervals. That is, one optical fiber ribbon 30 includes optical fibers 10 having identification mark, whose identification mark intervals L are different from each other.

Instead of the above-described connected optical fiber ribbon 30, an intermittent optical fiber ribbon 30 as shown in FIG. 7B may be used. This optical fiber ribbon 30 is formed by arranging, for example, eight optical fibers 10 having identification mark in parallel and intermittently connecting adjacent optical fibers by a connecting portion and a non-connecting portion. The tape coating 34 is provided on a circumference of each optical fiber 10 having identification mark, and, for example, optical fibers each obtained by integrating two optical fibers are intermittently connected by the connecting portion 32 and the non-connecting portion 33. In the connecting portion 32, the adjacent tape coatings 34 are connected with each other, and in the non-connecting portion 33, the adjacent tape coatings 34 are separated from each other without being connected with each other.

Alternatively, as shown in FIG. 7C, an optical fiber ribbon 30, which has a structure in which the tape coating 34 is recessed between (corresponding to the connecting portion 32) adjacent optical fibers 10 having identification mark, may be used.

As shown in FIG. 6, the slot rod 40 is wound with the wrapping tape 50 so that the optical fiber ribbons 30 do not protrude, and is integrated into, for example, a round shape.

As the wrapping tape 50, for example, a tape obtained by forming polyethylene terephthalate (PET) into a tape shape, a tape obtained by bonding a base material such as PET to a nonwoven fabric, or the like is used. Note that a water absorbing agent (for example, water absorbing powder) may be applied to an inner side of the wrapping tape. When the wrapping tape functions as a water absorption layer, water may be prevented from entering the optical fiber ribbon.

An outer side of the wrapping tape 50 is covered with the cable sheath 51 made of, for example, polyethylene (PE), polyvinyl chloride (PVC), or the like, and is formed in, for example, a round shape.

In FIG. 6, although an example of a slot cable in which the optical fibers 10 having identification mark are housed has been described, the optical fibers 10 having identification mark can also be housed in a slotless cable.

Instead of the optical fiber ribbon 30A, a loose tube cable in which the optical fibers 10 having identification mark are directly housed in a cable may be used. In the case of the optical fiber ribbon 30, the optical fiber ribbons 30 can be distinguished from each other by a color of the tape coating 34. However, in the case of the loose tube cable, it is required to distinguish the optical fibers 10 having identification mark from each other. Therefore, it is preferable to apply the present invention in which the optical fibers having identification mark are distinguished from each other based on a combination of the color of the colored layer 16, the number of identification marks, and the interval between the identification marks.

It should be understood that the embodiments disclosed herein are exemplary and non-restrictive in all respects. The scope of the present disclosure is defined by the claims, rather than the meaning described above, and is intended to include any modifications within the scope and meaning equivalent to the claims.

REFERENCE SIGNS LIST

10 Optical fiber having identification mark, 11 Identification mark, 12 Continuous identification mark, 13 Glass fiber, 14 Primary resin layer, 15 Secondary resin layer, 16 Colored layer, 17 Coated optical fiber, 20 Optical fiber cable, 30 Optical fiber ribbon, 32 Connecting portion, 33 Non-connecting portion, 34 Tape coating, 40 Slot rod, 41 Tension member, 42 Slot groove, 43 Slot rib, 50 Wrapping tape, 51 Cable sheath, L Identification mark interval

The invention claimed is:

1. An optical fiber having identification mark, comprising:
an optical transmission medium including a core part and a cladding part;
a primary resin layer coating the optical transmission medium; and
a secondary resin layer coating the primary resin layer,
wherein identification marks for optical fiber identification are provided on a surface of the secondary resin layer at a predetermined interval along an axial direction of the optical transmission medium, and wherein an effective area of the optical transmission medium at a wavelength of 1550 nm is 90 $\mu m^2$ or more, the predetermined interval is 350 mm or more and 500 mm or less, and a Young's modulus of the primary resin layer is 0.9 MPa or less.

2. The optical fiber having identification mark according to claim 1,
wherein the effective area of the optical transmission medium is 100 $\mu m^2$ or more and 170 $\mu m^2$ or less.

3. The optical fiber having identification mark according to claim 2,
wherein the Young's modulus of the primary resin layer is 0.6 MPa or less.

4. The optical fiber having identification mark according to claim 1,
wherein a transmission loss of the optical transmission medium at a wavelength of 1550 nm is 0.17 dB/km or less.

5. The optical fiber having identification mark according to claim 1,
wherein the identification mark is a single identification mark.

6. The optical fiber having identification mark according to claim 1,
wherein the identification mark is a continuous identification mark in which a plurality of identification marks are formed continuously.

7. An optical fiber ribbon in which a plurality of the optical fibers having identification mark according to claim 1 are arranged in parallel and a circumference of each of the plurality of optical fibers having identification mark is coated with a tape coating,
wherein the optical fiber ribbon includes the optical fibers having identification mark, whose predetermined intervals are different from each other.

8. An optical fiber cable in which a plurality of the optical fibers having identification mark according to claim 1 are housed,
wherein the optical fiber cable includes the optical fibers having identification mark, whose predetermined intervals are different from each other.

9. A method for manufacturing an optical fiber having identification mark, the optical fiber having identification mark including an optical transmission medium including a core part and a cladding part, a primary resin layer coating the optical transmission medium, a secondary resin layer coating the primary resin layer, and a colored layer, and identification marks for optical fiber identification being provided on an outer surface of the secondary resin layer or the colored layer at a predetermined interval along an axial direction of the optical transmission medium,
in which an effective area of the optical transmission medium at a wavelength of 1550 nm is 90 $\mu m^2$ or more, and a Young's modulus of the primary resin layer is 0.9 MPa or less,
the method comprising:
a step of providing the identification marks on the outer surface of the secondary resin layer or the colored layer at an interval of 100 mm or more and 500 mm or less; and
a step of measuring a transmission loss after providing the mark at a wavelength of 1550 nm for the optical fiber provided with the identification mark,
wherein an excess loss of the measured transmission loss after providing the mark is 0.003 dB/km or less.

* * * * *